United States Patent
Gelmetti

(10) Patent No.: US 8,668,086 B2
(45) Date of Patent: Mar. 11, 2014

(54) COVER FOR WELDING WIRE CONTAINER

(75) Inventor: Carlo Gelmetti, Lazise (IT)

(73) Assignee: Sidergas SpA (IT)

( * ) Notice: Subject to any disclaimer, the term of this patent is extended or adjusted under 35 U.S.C. 154(b) by 269 days.

(21) Appl. No.: 12/572,994

(22) Filed: Oct. 2, 2009

(65) Prior Publication Data

US 2010/0084296 A1    Apr. 8, 2010

(30) Foreign Application Priority Data

Oct. 7, 2008    (EP) .................................... 08017572

(51) Int. Cl.
*B65D 85/04*    (2006.01)

(52) U.S. Cl.
USPC ........... 206/393; 206/408; 206/409; 242/128; 242/423.1; 242/160.2; 242/170; 242/172

(58) Field of Classification Search
USPC .......... 206/408, 393, 409, 407, 389; 242/129, 242/159, 171, 160.2, 170, 172, 128
See application file for complete search history.

(56) References Cited

U.S. PATENT DOCUMENTS

| | | |
|---|---|---|
| 318,062 A | 5/1885 | Warren |
| 532,565 A | 1/1895 | Kilmer |
| 617,353 A | 1/1899 | Redmond |
| 627,722 A | 6/1899 | Edwards |
| 932,808 A | 8/1909 | Pelton |
| 1,276,117 A | 8/1918 | Riebe ............................ 464/171 |
| 1,468,994 A | 9/1923 | Cook ............................ 206/393 |
| 1,508,689 A | 9/1924 | Glasser .................... 219/124.03 |
| 1,640,368 A | 8/1927 | Obetz |
| 1,821,354 A * | 9/1931 | Meyer ........................... 242/159 |
| 1,907,051 A | 5/1933 | Emery |
| 2,027,670 A | 1/1936 | Broeren .......................... 221/55 |
| 2,027,674 A | 1/1936 | Broeren .......................... 221/55 |
| 2,059,462 A | 11/1936 | Jungmann |
| 2,329,369 A | 9/1943 | Haver ............................. 285/11 |
| 2,407,746 A | 9/1946 | Johnson |
| 2,457,910 A | 1/1949 | McLaren et al. ................ 74/501 |
| 2,477,059 A | 7/1949 | Hill ............................ 242/137.1 |
| 2,483,760 A | 10/1949 | Duncan ......................... 254/190 |
| 2,579,131 A | 12/1951 | Tinsley ......................... 206/409 |
| 2,580,900 A | 1/1952 | Epstein ......................... 206/409 |
| 2,679,571 A | 5/1954 | Chappel .................... 219/137.44 |
| 2,694,130 A | 11/1954 | Howard ............................ 219/8 |
| 2,713,938 A | 7/1955 | Snyder |
| 2,724,538 A | 11/1955 | Schweich |
| 2,838,922 A | 6/1958 | Gift ............................. 66/125 R |

(Continued)

FOREIGN PATENT DOCUMENTS

| | | | | |
|---|---|---|---|---|
| EP | 1974846 | 10/2008 | ............ | B23K 9/133 |
| WO | WO 02/094493 | 11/2002 | ............ | B23K 9/133 |
| WO | WO 2005/061168 | 7/2005 | ............ | B23K 9/133 |

OTHER PUBLICATIONS

Search Report received in Applicant's counterpart European Patent Application Serial No. 08017572.2-2302.

(Continued)

*Primary Examiner* — Andrew Perreault
(74) *Attorney, Agent, or Firm* — Hayes Soloway P.C.

(57) ABSTRACT

A cover for a welding wire container has a body portion provided with an elongate slot through which the welding wire can be withdrawn from the container, and at least one flap formed integrally therewith and partially defining the slot.

39 Claims, 3 Drawing Sheets

(56) References Cited

U.S. PATENT DOCUMENTS

| | | | | |
|---|---|---|---|---|
| 2,849,195 | A | 8/1958 | Richardson | |
| 2,864,565 | A | 12/1958 | Whearly | 242/128 |
| 2,869,719 | A | 1/1959 | Hubbard | |
| 2,880,305 | A | 3/1959 | Baird | |
| 2,911,166 | A | 11/1959 | Haugwitz | 242/128 |
| 2,929,576 | A | 3/1960 | Henning | |
| 2,966,258 | A | 12/1960 | Krafft | |
| 2,974,850 | A | 3/1961 | Mayer | |
| 2,984,596 | A | 5/1961 | Franer | 206/412 |
| 3,022,415 | A | 2/1962 | Francois | 219/137.44 |
| 3,096,951 | A | 7/1963 | Jenson | 242/137.1 |
| 3,108,180 | A | 10/1963 | Linnander | 219/137.44 |
| 3,119,042 | A | 1/1964 | Bond | |
| 3,185,185 | A | 5/1965 | Pfund | |
| 3,244,347 | A | 4/1966 | Jenk | |
| 3,274,850 | A | 9/1966 | Tascio | 74/501 |
| 3,283,121 | A | 11/1966 | Bernard | 219/137.44 |
| 3,284,608 | A | 11/1966 | McDonald | 219/137.44 |
| 3,344,682 | A | 10/1967 | Bratz | 74/501 |
| 3,352,412 | A | 11/1967 | Draving et al. | 206/59 |
| 3,353,412 | A | 11/1967 | Draving et al. | |
| 3,433,504 | A | 3/1969 | Hanes | 285/93 |
| 3,463,416 | A | 8/1969 | Quenot | 242/396.9 |
| 3,478,435 | A | 11/1969 | Cook | |
| 3,491,876 | A | 1/1970 | Zecchin | |
| 3,512,635 | A | 5/1970 | Lang | |
| 3,536,888 | A | 10/1970 | Borneman | 219/137.43 |
| 3,565,129 | A | 2/1971 | Field | |
| 3,567,900 | A | 3/1971 | Nelson | |
| 3,576,966 | A | 5/1971 | Sullivan | |
| 3,595,277 | A | 7/1971 | Lefever | |
| 3,648,920 | A | 3/1972 | Stump | |
| 3,690,567 | A | 9/1972 | Borneman | 219/591 |
| 3,724,249 | A | 4/1973 | Asbeck et al. | |
| 3,729,092 | A | 4/1973 | Marcell | |
| 3,730,136 | A | 5/1973 | Okada | 118/78 |
| 3,799,215 | A | 3/1974 | Willems | |
| 3,815,842 | A | 6/1974 | Scrogin | 242/423.1 |
| 3,823,894 | A | 7/1974 | Frederick et al. | 242/137.1 |
| 3,939,978 | A | 2/1976 | Thomaswick | 206/454 |
| 4,000,797 | A | 1/1977 | Ducanis | 193/38 |
| 4,043,331 | A | 8/1977 | Martin et al. | 128/156 |
| 4,044,583 | A | 8/1977 | Kinney, Jr. | |
| 4,074,105 | A | 2/1978 | Minehisa et al. | |
| 4,097,004 | A | 6/1978 | Reese | 242/129 |
| 4,102,483 | A | 7/1978 | Ueyama et al. | |
| 4,113,795 | A | 9/1978 | Izawa et al. | 524/84 |
| 4,127,590 | A | 11/1978 | Endo et al. | 260/346.74 |
| 4,157,436 | A | 6/1979 | Endo et al. | 528/167 |
| 4,161,248 | A | 7/1979 | Kalmanovitch | 206/389 |
| 4,172,375 | A | 10/1979 | Rushforth et al. | |
| 4,188,526 | A | 2/1980 | Asano | |
| 4,222,535 | A | 9/1980 | Hosbein | 242/128 |
| 4,254,322 | A | 3/1981 | Asano | |
| 4,274,607 | A | 6/1981 | Priest | 242/163 |
| 4,280,951 | A | 7/1981 | Saito et al. | 524/118 |
| 4,293,103 | A | 10/1981 | Tsukamoto | |
| 4,354,487 | A | 10/1982 | Oczkowski et al. | 604/366 |
| 4,392,606 | A | 7/1983 | Fremion | 206/600 |
| 4,396,797 | A | 8/1983 | Sakuragi et al. | 174/68 |
| 4,429,001 | A | 1/1984 | Kolpin et al. | 442/340 |
| 4,451,014 | A | 5/1984 | Kitt et al. | 242/128 |
| 4,464,919 | A | 8/1984 | Labbe | |
| 4,500,315 | A | 2/1985 | Pieniak et al. | 604/379 |
| 4,540,225 | A | 9/1985 | Johnson et al. | 439/192 |
| 4,546,631 | A | 10/1985 | Eisinger | |
| 4,575,612 | A | 3/1986 | Prunier | 219/137.43 |
| 4,582,198 | A | 4/1986 | Ditton | |
| 4,585,487 | A | 4/1986 | Destree et al. | |
| 4,623,063 | A | 11/1986 | Balkin | |
| 4,737,567 | A | 4/1988 | Matsumoto et al. | 528/167 |
| 4,742,088 | A | 5/1988 | Kim | 521/118 |
| 4,826,497 | A | 5/1989 | Marcus et al. | 604/359 |
| 4,855,179 | A | 8/1989 | Bourland et al. | 442/409 |
| 4,869,367 | A | 9/1989 | Kawasaki et al. | 206/409 |
| 4,891,493 | A | 1/1990 | Sato et al. | |
| 4,916,282 | A | 4/1990 | Chamming et al. | 219/69.2 |
| 4,918,286 | A | 4/1990 | Boyer | 219/137.44 |
| 4,949,567 | A | 8/1990 | Corbin | |
| 4,974,789 | A * | 12/1990 | Milburn | 242/159 |
| 5,051,539 | A | 9/1991 | Leathers-Wiessner | |
| 5,061,259 | A | 10/1991 | Goldman et al. | 604/368 |
| 5,078,269 | A | 1/1992 | Dekko et al. | |
| 5,100,397 | A | 3/1992 | Poccia et al. | 604/365 |
| 5,105,943 | A | 4/1992 | Lesko et al. | |
| 5,109,983 | A * | 5/1992 | Malone et al. | 206/408 |
| 5,147,646 | A | 9/1992 | Graham | |
| 5,165,217 | A * | 11/1992 | Sobel et al. | 242/159 |
| 5,201,419 | A | 4/1993 | Hayes | 206/409 |
| 5,205,412 | A | 4/1993 | Krieg | |
| 5,215,338 | A | 6/1993 | Kimura et al. | 285/166 |
| 5,227,314 | A | 7/1993 | Brown et al. | |
| 5,261,625 | A | 11/1993 | Lanoue | 242/129.8 |
| 5,277,314 | A | 1/1994 | Cooper et al. | 206/398 |
| 5,314,111 | A | 5/1994 | Takaku et al. | |
| 5,368,245 | A | 11/1994 | Fore | 242/171 |
| 5,372,269 | A | 12/1994 | Sutton et al. | |
| 5,452,841 | A | 9/1995 | Sibata et al. | |
| 5,485,968 | A | 1/1996 | Fujioka | 242/172 |
| 5,494,160 | A | 2/1996 | Gelmetti | 242/119.72 |
| 5,530,088 | A | 6/1996 | Sheen et al. | 528/287 |
| 5,553,810 | A | 9/1996 | Bobeczko | |
| 5,562,646 | A | 10/1996 | Goldman et al. | 604/368 |
| 5,585,013 | A | 12/1996 | Truty | 219/69.12 |
| 5,586,733 | A | 12/1996 | Miura et al. | 242/125.2 |
| 5,590,848 | A | 1/1997 | Shore et al. | |
| 5,629,377 | A | 5/1997 | Burgert et al. | 524/832 |
| 5,665,801 | A | 9/1997 | Chang et al. | 524/125 |
| 5,692,700 | A | 12/1997 | Bobeczko | |
| 5,714,156 | A | 2/1998 | Schmidt et al. | 424/404 |
| 5,738,209 | A | 4/1998 | Burr et al. | 206/397 |
| 5,739,704 | A | 4/1998 | Clark | |
| 5,746,380 | A | 5/1998 | Chung | |
| 5,758,834 | A * | 6/1998 | Dragoo et al. | 242/128 |
| 5,778,939 | A | 7/1998 | Hok-Yin | 138/120 |
| 5,816,466 | A | 10/1998 | Seufer | |
| 5,819,934 | A | 10/1998 | Cooper | |
| 5,845,862 | A | 12/1998 | Cipriani | 242/423.1 |
| 5,847,184 | A | 12/1998 | Kleiner | 558/73 |
| 5,865,051 | A | 2/1999 | Otzen et al. | |
| 5,921,391 | A | 7/1999 | Ortiz et al. | 206/397 |
| 5,931,408 | A | 8/1999 | Ishii et al. | 242/580 |
| 5,971,308 | A | 10/1999 | Boulton | |
| 5,988,370 | A | 11/1999 | Roemer et al. | 206/215 |
| 5,990,377 | A | 11/1999 | Chen et al. | 604/381 |
| 6,016,911 | A | 1/2000 | Chen | 200/395 |
| 6,019,303 | A | 2/2000 | Cooper | |
| 6,103,358 | A | 8/2000 | Bruggemann et al. | 428/317.9 |
| 6,159,591 | A | 12/2000 | Beihoffer et al. | 428/327 |
| 6,237,768 | B1 | 5/2001 | Cipriani | |
| 6,245,880 | B1 | 6/2001 | Takeuchi et al. | 528/287 |
| 6,255,371 | B1 | 7/2001 | Schlosser et al. | 524/100 |
| 6,260,781 | B1 | 7/2001 | Cooper | |
| 6,301,944 | B1 | 10/2001 | Offer | |
| 6,322,016 | B1 | 11/2001 | Jacobsson et al. | |
| 6,340,522 | B1 | 1/2002 | Burke et al. | |
| 6,408,888 | B1 | 6/2002 | Baumer et al. | 138/120 |
| 6,417,425 | B1 | 7/2002 | Whitmore et al. | 604/367 |
| 6,425,549 | B1 | 7/2002 | Bae et al. | 242/580 |
| 6,441,067 | B1 | 8/2002 | Chiu et al. | 524/117 |
| 6,464,077 | B1 | 10/2002 | Liu | |
| 6,481,892 | B1 | 11/2002 | Agostini | 384/43 |
| 6,498,227 | B1 | 12/2002 | Horie | |
| 6,524,010 | B1 | 2/2003 | Derman | 384/513 |
| 6,547,176 | B1 | 4/2003 | Blain et al. | 242/423.1 |
| 6,564,943 | B2 | 5/2003 | Barton et al. | 206/395 |
| 6,613,848 | B1 | 9/2003 | Wang et al. | 525/481 |
| 6,636,776 | B1 | 10/2003 | Barton et al. | |
| 6,648,141 | B2 | 11/2003 | Land | |
| 6,649,870 | B1 | 11/2003 | Barton et al. | |
| 6,708,864 | B2 | 3/2004 | Ferguson, III et al. | |
| 6,715,608 | B1 | 4/2004 | Moore | 206/397 |
| 6,745,899 | B1 | 6/2004 | Barton | |
| 6,749,139 | B2 | 6/2004 | Speck | |

(56) References Cited

U.S. PATENT DOCUMENTS

| | | | |
|---|---|---|---|
| 6,750,262 B1 | 6/2004 | Hahnle et al. | 521/64 |
| 6,753,454 B1 | 6/2004 | Smith et al. | 602/41 |
| 6,821,454 B2 | 11/2004 | Visca et al. | |
| 6,831,142 B2 | 12/2004 | Mertens et al. | 526/328.5 |
| 6,872,275 B2 | 3/2005 | Ko et al. | 156/181 |
| 6,889,835 B2 | 5/2005 | Land | 206/408 |
| 6,913,145 B2 | 7/2005 | Barton | 206/409 |
| 6,938,767 B2 | 9/2005 | Gelmetti | 206/386 |
| 6,977,357 B2 | 12/2005 | Hsu et al. | |
| 7,004,318 B2 | 2/2006 | Barton | 206/409 |
| 7,108,916 B2 | 9/2006 | Ehrnsperger et al. | 428/403 |
| 7,147,176 B2 | 12/2006 | Rexhaj | |
| 7,152,735 B2 | 12/2006 | Dragoo et al. | |
| 7,156,334 B1 | 1/2007 | Fore et al. | 242/171 |
| 7,178,755 B2 | 2/2007 | Hsu et al. | 242/423.1 |
| 7,198,152 B2 | 4/2007 | Barton et al. | |
| 7,220,942 B2 | 5/2007 | Barton et al. | |
| 7,309,038 B2 * | 12/2007 | Carroscia | 206/409 |
| 7,377,388 B2 | 5/2008 | Hsu et al. | 206/389 |
| 7,410,111 B2 | 8/2008 | Carroscia | |
| 7,441,657 B2 * | 10/2008 | Gelmetti | 206/393 |
| 7,441,721 B2 | 10/2008 | Bae et al. | 242/128 |
| 7,533,906 B2 | 5/2009 | Luettgen et al. | 285/146.1 |
| 7,563,840 B2 | 7/2009 | Ye | 524/449 |
| 7,748,530 B2 * | 7/2010 | Hsu et al. | 206/408 |
| 7,950,523 B2 | 5/2011 | Gelmetti | 206/408 |
| 8,207,475 B2 | 6/2012 | Minato et al. | 219/137.31 |
| 8,235,210 B2 | 8/2012 | De Lacerda et al. | 206/393 |
| 2001/0014706 A1 | 8/2001 | Sprenger et al. | 523/400 |
| 2002/0000391 A1 | 1/2002 | Kawasai et al. | 206/408 |
| 2002/0003014 A1 | 1/2002 | Homma | |
| 2002/0014477 A1 | 2/2002 | Lee et al. | |
| 2002/0039869 A1 | 4/2002 | Achille | |
| 2002/0120178 A1 | 8/2002 | Tartaglia et al. | 600/114 |
| 2003/0042162 A1 | 3/2003 | Land | 206/408 |
| 2003/0042163 A1 | 3/2003 | Cipriant | |
| 2003/0052030 A1 | 3/2003 | Gelmetti | 206/397 |
| 2003/0184086 A1 | 10/2003 | Christianson | 285/146.1 |
| 2004/0020041 A1 | 2/2004 | Ferguson, III et al. | |
| 2004/0050441 A1 | 3/2004 | Roschi | 138/120 |
| 2004/0133176 A1 | 7/2004 | Muthiah et al. | 604/368 |
| 2004/0155090 A1 | 8/2004 | B.-Jensen | |
| 2004/0176557 A1 | 9/2004 | Mertens et al. | 526/328.5 |
| 2004/0186244 A1 | 9/2004 | Hatsuda et al. | 525/451 |
| 2004/0201117 A1 | 10/2004 | Anderson | |
| 2004/0241333 A1 | 12/2004 | Cielenski et al. | 427/421.1 |
| 2004/0265387 A1 | 12/2004 | Hermeling et al. | 424/486 |
| 2005/0008776 A1 | 1/2005 | Chhabra et al. | 427/180 |
| 2005/0261461 A1 | 11/2005 | Maeda et al. | 528/272 |
| 2006/0027699 A1 | 2/2006 | Bae et al. | |
| 2006/0074154 A1 | 4/2006 | Harashina et al. | 524/115 |
| 2006/0155254 A1 | 7/2006 | Sanz et al. | 604/378 |
| 2006/0247343 A1 | 11/2006 | Kishimoto et al. | 524/117 |
| 2006/0258824 A1 | 11/2006 | Oshima et al. | 525/533 |
| 2006/0278747 A1 | 12/2006 | Carroscia | |
| 2007/0175786 A1 | 8/2007 | Nicklas | |
| 2007/0272573 A1 | 11/2007 | Gelmetti | |
| 2007/0284354 A1 | 12/2007 | Laymon | 219/137.51 |
| 2008/0156925 A1 | 7/2008 | Cooper | 242/559.3 |
| 2008/0257875 A1 | 10/2008 | De Keizer | 219/137.44 |
| 2008/0300349 A1 | 12/2008 | Fuchikami et al. | 524/117 |
| 2008/0314876 A1 | 12/2008 | Pinsonneault et al. | 219/74 |
| 2009/0014572 A1 | 1/2009 | Weissbrod et al. | |
| 2009/0014579 A1 | 1/2009 | Bender et al. | |
| 2009/0200284 A1 | 8/2009 | Sanchez | 219/137.51 |
| 2010/0116803 A1 | 5/2010 | Gelmetti | 219/138 |
| 2011/0073703 A1 | 3/2011 | Gelmetti et al. | 242/615.2 |
| 2011/0094911 A1 | 4/2011 | Gelmetti | 206/408 |
| 2011/0114523 A1 | 5/2011 | Gelmetti | 206/407 |
| 2011/0114617 A1 | 5/2011 | Gelmetti et al. | 219/137.9 |
| 2011/0132880 A1 | 6/2011 | Kossowan | 219/76.14 |

OTHER PUBLICATIONS

US Official Action dated Mar. 5, 2013 issued in U.S. Appl. No. 13/382,491 (33 pgs).

Notice of Allowance dated Mar. 5, 2013 issued in U.S. Appl. No. 12/539,271 (15 pgs).

Notice of Allowance dated Mar. 18, 2013 issued in U.S. Appl. No. 12/994,686 (10 pgs).

* cited by examiner

COVER FOR WELDING WIRE CONTAINER

FIELD OF THE INVENTION

The invention relates to a cover for a welding wire container and to a welding wire container having a cover.

BACKGROUND OF THE INVENTION

Welding wire for automatic welding machines is provided in coils, each coil being placed in a container. On top of the container, a cover is provided in order to prevent dirt or other contaminations from entering into the container. The cover typically consists of cardboard or a plastics material.

In order to continuously feed welding wire to the welding machine, it is known to use two containers, namely a first container which currently provides the welding wire, and a second container which is being used as soon as the wire from the first container has been entirely consumed. The end of the welding wire of the first container is joined to the beginning of the welding wire of the second container so that a continuous supply of the welding wire is ensured. After the first container is empty and the welding wire is being withdrawn from the second container, the first container is replaced by a new container, and the beginning of the welding wire of the new container is joined to the end of the welding wire from the container currently used.

Essential for the proper function of such system is that the welding wire does not entangle or kink, in particular when the welding wire of one container has been almost entirely consumed so that the small remaining portion of the welding wire is withdrawn from the container.

DETAILED DESCRIPTION OF THE INVENTION

WO 02/094493 shows a system with two containers in which a runner is arranged on the welding wire. The runner is a solid body and is intended to prevent kinks in the wire by means of its weights. However, this solution has proven to not work satisfactorily. Further, a cover which is to be arranged on top of the container must have a wide opening in order to allow the runner from escaping from the currently used container. Due to this wide opening, the cover can however not prevent dirt from entering into the container.

WO 2005/061168 shows a cover for a welding wire container having spacing means and/or tabs on top of the cover for holding down the wire. This system however involves high manufacturing costs for the cover.

SUMMARY OF THE INVENTION

The object of the invention is to provide a cover for a welding wire container which prevents entanglement or kinks in the welding wire, in particular when the system is switching from one container to the other, while at the same time being reliable and not involving high manufacturing costs.

BRIEF DESCRIPTION OF THE INVENTION

To this end, the invention provides a cover for a welding wire container, having a body portion provided with an elongate slot through which the welding wire can be withdrawn from the container, the cover having at least one flap formed integrally therewith and partially defining the slot. As the flap is formed integrally with the cover, no steps for mounting the flap are necessary, resulting in reduced manufacturing costs. As the flap is made from the material of the cover, which preferably is plastics, it is of sufficient rigidity to reliably hold the welding wire in the desired position while at the same time being sufficiently elastic in order to allow the welding wire to escape from the slot when changing over from the container currently supplying the welding wire, to the next container. The term "flap" as used herein designates a portion of the cover which is flexible so that is elastically bends under certain loads being applied to it by the welding wire, in particular a portion of the cover which at one end or side continuously merges into the remainder of the cover while with the other side being free and deflectable from the original position. The term "slot" as used herein designates an elongate opening having a length, measured perpendicularly to the widths of the material of the cover, which is sufficiently greater than the width of the slot.

According to a preferred embodiment, the flap is triangular, one side of the flap being integrally connected to the cover and the other sides ending at the slot. This form of the flap and also of the slot has proven to provide a superior retention of the welding wire.

Preferably, the flap is curved, in particular such that a free tip of the flap is bent downwardly. This adds to reliably retaining the welding wire.

According to a preferred embodiment, the slot is formed hook-shaped, with an end leg of the slot extending parallel to an adjacent outer contour of the cover. This orientation of the slot allows to smoothly guide the welding wire from the interior of the container towards an adjacent container.

Preferably, the end leg of the slot has a widened portion. This gives the welding wire some freedom when extending through the cover, which avoids sharp bending and associated stress. The width of the widened portion of the end leg has preferably a maximum width of more than 20 mm.

According to a preferred embodiment of the invention, the cover has at least one holding finger for holding down welding wire, the holding finger being formed integrally with the cover. The holding finger(s) serves for holding the welding wire having left the cover through the slot, flat on top of the cover in order to prevent it from touching other object, possibly resulting in a short circuit, and from entangling. Forming the holding finger integrally with the cover allows to keep manufacturing costs down as no separate mounting steps are necessary.

In order to increase the holding effect, a plurality of holding fingers are provided, in particular 4 or more holding fingers.

In order to even more increase the holding effect, a wire accommodation groove is provided underneath the finger(s). The groove in cooperation with the holding finger(s) provides for secure and reliable holding of the welding wire while at the same time allowing the welding wire to escape from the groove when the system switches from the container currently used to the subsequent container.

Preferably, the groove in the cover is formed integrally from a material portion of the cover. This helps in keeping the manufacturing costs down as the entire cover including the flap, the finger(s) and the groove is made in one piece.

According to a preferred embodiment, the groove is curved, the center of curvature of the groove being located within the contour of the cover, and a first end of the groove pointing towards the flap. Accordingly, the welding wire is guided by the groove in a curved manner as a continuation of the direction in which the welding wire comes from the interior of the container.

Preferably, the cover is made from plastics. This allows to easily form the flap, the fingers and the groove by simply molding the cover and forming the flap, the fingers and the groove, either directly in the mold by a suitable design of the mold, or by later providing cuts which form the flap, the slot and the fingers.

The invention also provides a welding wire container having a cover as described above.

The invention is now described in detail by means of an embodiment which is shown in the drawings. In the drawings, FIG. 1 shows a side view of a system using two welding wire containers with covers according to the invention;

Figure 1:
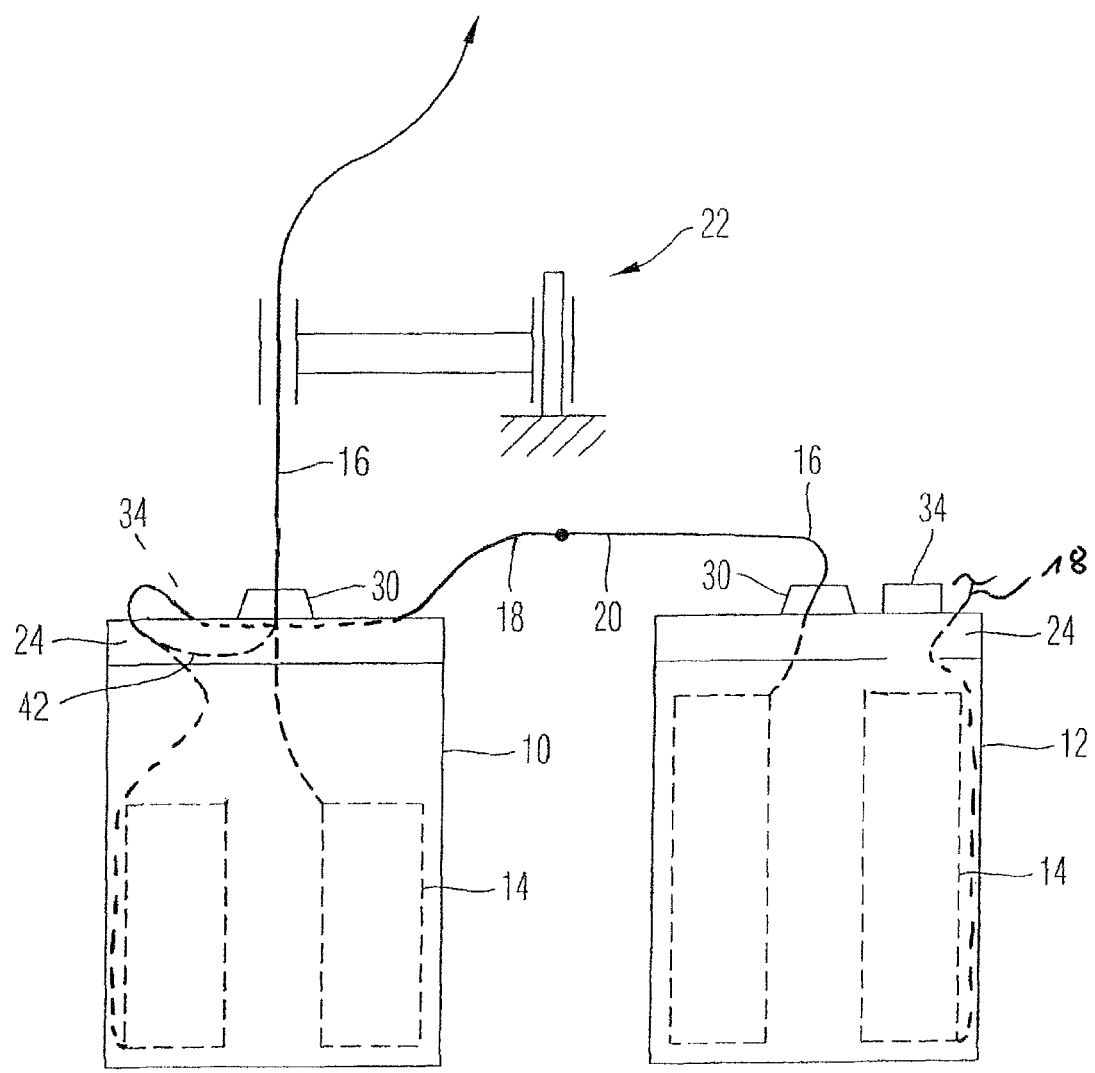
Figure 2:
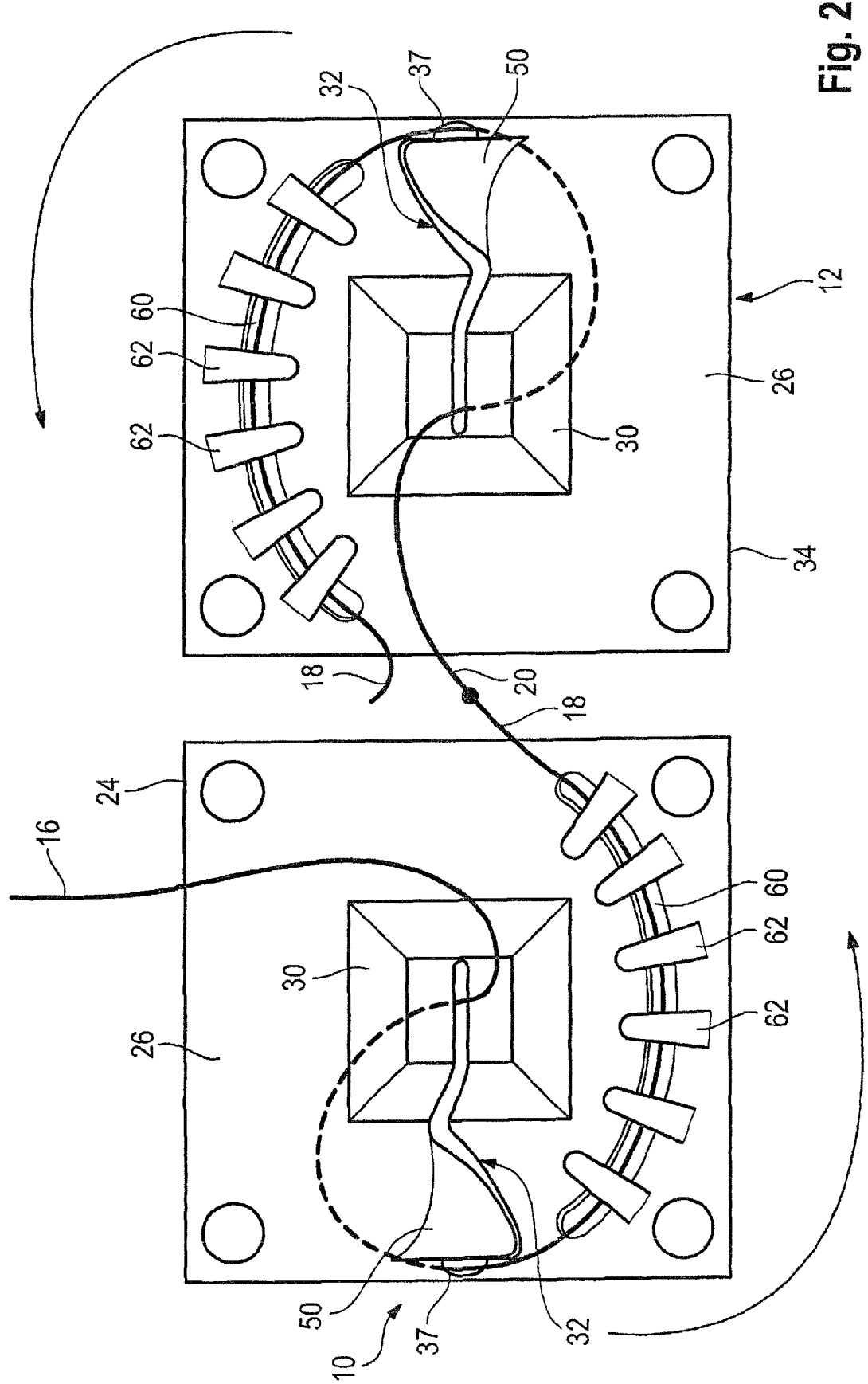
FIG. 2 shows a top view of the system of FIG. 1.

FIGS. 1 and 2 show a first welding wire container 10 and a second welding wire container 12. Both welding wire containers contain a coil 14 of welding wire 16. The end portion 18 of the welding wire contained in the first container 10 is joined by a butt welding to the beginning or front portion 20 of the welding wire coil contained in the second container 12. The welding wire 16 is withdrawn from the welding wire containers 10, 12 through a feeding system 22 which is only schematically depicted.

Figure 3:
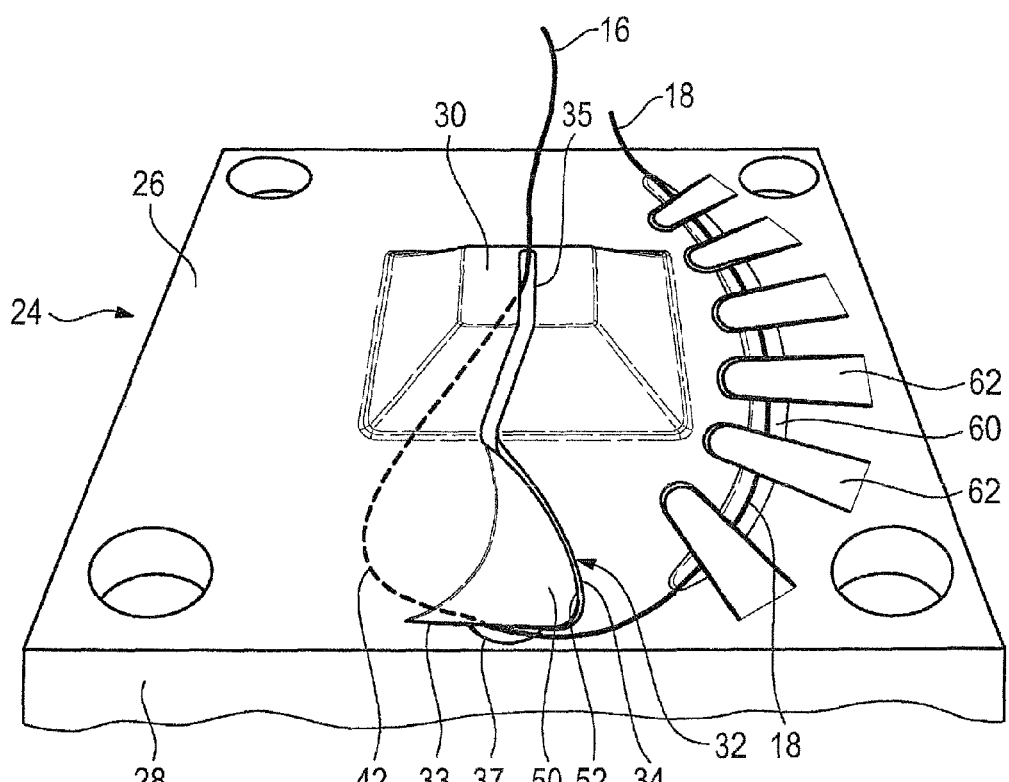
FIG. 3 shows in a perspective top view a cover which is used in the system shown in FIGS. 1 and 2.
Figure 4:
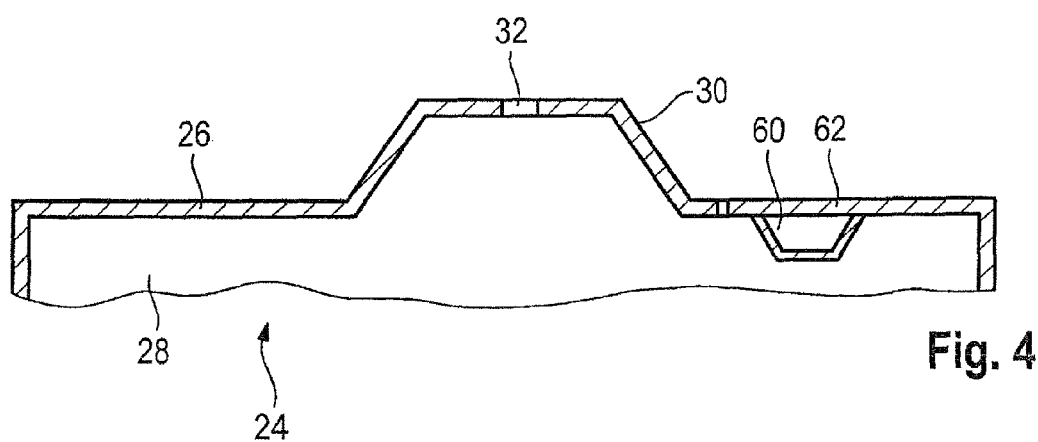
FIG. 4 shows the cover in a cross-section along line IV-IV of FIG. 3.

On top of each container 10, 12 a cover 24 (see also FIGS. 3 and 4) is arranged. Each cover has an upper body portion 26 which is basically plate-like and closes an upper opening of the respective container, and side walls 28 extending from the upper body portion 26 and positioning the cover on the respective container.

In the center of the upper body portion 26, a truncated pyramid 30 is provided. Further, a slot 32 is provided in the upper body portion 26. The slot 32 extends from an edge of the cover 24 towards and beyond the center of the upper body portion 26. As can be seen in particular in FIG. 3, the slot 32 is hook-shaped, with an end portion 33 of slot 32 extending parallel and adjacent to the outer contour of the cover 24, with an intermediate portion 34 being slightly curved and extending at an angle of less than 90° "backwardly", that is to say towards the middle of the cover, and towards the side to which end portion 33 points. The end portion 33 of the slot 32 together with the intermediate portion 34 defines a flap 50 which is generally triangular. One side of the triangular flap 50 is connected integrally to the cover body 26, and the other two sides are defined by the end portion 33 and the intermediate portion 34 of the slot 32. The intermediate portion 34 of the slot ends at the foot of the truncated pyramid 30 where a center portion 35 of the slot 32 begins which extends up to the middle of cover 24 and beyond the middle.

The slot 32 has in its center portion 35 a width of approximately 10 mm and in its intermediate portion 34 and end portion 33 a width which is less than the width of the center portion 35, in particular a width of 1 to 2 mm. The end portion 33 is provided with a widened portion 37 in the shape of a section of a circle, the width of the slot here having a maximum of approximately 30 mm.

Flap 50 has, due to one of its sides being integrally connected to the cover body 26, a free end which is designated with reference numeral 52. Free end 52 is curved downwardly, that is to say into the space surrounded by side walls 28, so that its edge is situated at a level of approximately 20 mm below the level of the body portion 26 of the cover 24.

Assuming for the purpose of explanation that flap 50 is arranged in a lower sector of cover 24, a wire accommodation groove 60 (see in particular FIGS. 3 and 4) is provided in a right sector of cover 24. Groove 60 is formed integrally with the material of cover body 26 in that the material, in the region of the groove, is at a lower level than the general level of cover body 26. A plurality of holding fingers 62 are provided which each cross the groove so that a closed channel is formed, having a bottom and sides formed from groove 60, and a top formed from the respective finger 62. The center of curvature of groove 60 is within the contour of the cover, in particular somewhere within pyramid 30, and as the fingers 62 extend approximately perpendicularly with respect to groove 60, they point approximately towards the center of curvature. The holding fingers are in the same manner as the flap 50 formed integrally with cover body 26, and they extend in the same plane as the body portion of the cover. It can be clearly seen that the fingers are significantly longer than the groove is wide, and that the fingers extend beyond the groove.

Groove 60 is arranged such that is smoothly guides the welding wire from the point where it comes from the container through the cover, namely at widened portion 37 of end portion 33 of slot 32, towards the subsequent container.

Fingers 62 and groove 60 can be formed by cutting the fingers and then plastically deforming the material of the cover body between the fingers and at a region beyond the first and last finger so that a groove is formed which is defined be a plurality of short sections interrupted below the individual fingers.

Fingers 62 and groove 60 could also be formed directly when molding cover 24. Then, depending on the complexity of the mould, groove 60 can be formed interrupted, as explained above for a groove formed in a separate step by plastically deforming a portion of cover body 26, or can be formed continuously with the flaps extending in intervals perpendicularly thereto.

When a fresh welding wire container is prepared for being used (e.g. the right container in FIG. 2), the end portion 18 of the welding wire is fed through widened portion 37 of slot 32 and is then inserted into groove 60. Flap 50 holds the welding wire in widened portion 37 of the slot. Fingers 62 reliably hold the welding wire in groove 60. Then, the end portion 18 can later be welded to front portion 20 of a subsequent container (not shown in FIG. 2), and the front portion 20 of the currently prepared container is welded to the end portion 18 of the currently used container (in FIG. 2 the left container), which extends from groove 60 of the currently used container towards the subsequent container.

During operation, the welding wire is withdrawn from the respective container through central portion 35 of slot 32. After the welding wire stored in the respective container has been entirely used, only a small loop 42 of welding wire (please see FIGS. 1 and 3) remains in the container. Flap 50 ensures that the welding wire portion leading to the subsequent welding wire container is held spaced apart from the portion currently withdrawn from the container. This prevents any entanglement and kinks in the welding wire. If the welding wire is continued to be withdrawn from the container, loop 42 bends flap 50 upwardly in the region of its free tip 52 so that the welding wire entirely escapes from the interior of the first container. Then, the welding wire is withdrawn from groove 60 by elastically bending upwardly the fingers. The system then automatically continues to withdraw the welding wire from the second container. The first container can be replaced by a new container, the forward portion 20 of its welding wire being connected to the end portion 18 of the second container. Due the to welding wire being guided on top of the container in the curved groove, there is no risk that the welding wire entangles when switching from one container to the other.

Even though a preferred embodiment of the invention was described, it is obvious that there are variations which do not affect the general operation of the cover. The number of the holding fingers can be changed. Instead of using six holding fingers, a higher or small number of fingers can be provided. The groove does not necessarily have to be arranged in the manner shown in the drawings. Rather, a different curvature and/or location can be used. Further, the flap does not have to have a triangular shape. Instead of a single flap, a plurality of finger-like flaps extending over the slot can be used, for example extending from opposite sides in an alternative manner.

The invention claimed is:

1. A cover for a welding wire container, having an upper body portion provided with an elongate slot through which the welding wire can be withdrawn from the container, the cover having side walls on its periphery extending downwardly from the upper body portion for positioning the cover supported on a container, and at least one flap formed integrally therewith extending inwardly from the periphery, and partially defining the slot, wherein a free tip of the flap is bent downwardly, from the upper body portion, wherein at least one holding finger for holding down welding wire is provided, the holding finger being formed integrally with the cover.

2. The cover of claim 1 wherein the flap is essentially triangular, one side of the flap being integrally connected to the cover and the other sides ending at the slot.

3. The cover of claim 1 wherein the flap is curved.

4. The cover of claim 2 wherein the slot is formed hook-shaped, with an end portion of the slot extending parallel to an adjacent outer contour of the cover.

5. The cover of claim 4 wherein the end portion of the slot has a widened portion.

6. The cover of claim 5 wherein the widened portion of the end portion has a maximum width of more than 30 mm.

7. The cover of claim 1 wherein a plurality of holding fingers are provided.

8. The cover of claim 1 wherein a wire accommodation groove is provided underneath the finger(s).

9. The cover of claim 8 wherein the groove is formed integrally from a material portion of the cover.

10. The cover of claim 8 wherein the groove is curved, the center of curvature of the groove being located within the contour of the cover.

11. The cover of claim 8 wherein a first end of the groove pointing towards the flap.

12. The cover of claim 8 wherein the flap and a second end of the groove are arranged on opposite sides of the cover.

13. The cover of claim 1 wherein the cover is made from plastics.

14. A welding wire container provided with the cover according to claim 1.

15. The cover of claim 2 wherein the flap is curved.

16. The cover of claim 7 wherein a wire accommodation groove is provided underneath the finger(s).

17. The cover of claim 9 wherein the groove is curved, the center of curvature of the groove being located within the contour of the cover.

18. The cover of claim 9 wherein a first end of the groove pointing towards the flap.

19. The cover of claim 10 wherein a first end of the groove pointing towards the flap.

20. The cover of claim 9 wherein the flap and a second end of the groove are arranged on opposite sides of the cover.

21. The cover of claim 10 wherein the flap and a second end of the groove are arranged on opposite sides of the cover.

22. The cover of claim 11 wherein the flap and a second end of the groove are arranged on opposite sides of the cover.

23. The cover of claim 7 wherein four or more holding fingers are provided.

24. A cover for a welding wire container, having an upper body portion provided with an elongate slot through which the welding wire can be withdrawn from the container, the cover having side walls on its periphery extending downwardly from the upper body portion for positioning the cover supported on a container, and at least one flap formed integrally therewith extending inwardly from the periphery, and partially defining the slot, the cover further having an elongated wire accommodation groove formed integrally from a material portion of the upper body portion of the cover and extending below the upper body portion of the cover, wherein at least one holding finger for holding down welding wire in the accommodation groove is provided, the holding finger also being formed integrally with the upper body portion cover.

25. The cover of claim 24 wherein the flap is essentially triangular, one side of the flap being integrally connected to the cover and the other sides ending at the slot.

26. The cover of claim 24 wherein the flap is curved.

27. The cover of claim 26 wherein a free tip of the flap is bent downwardly.

28. The cover of claim 25 wherein the slot is formed hook-shaped, with an end portion of the slot extending parallel to an adjacent outer contour of the cover.

29. The cover of claim 28 wherein the end portion of the slot has a widened portion.

30. The cover of claim 29 wherein the widened portion of the end portion has a maximum width of more than 30 mm.

31. The cover of claim 24 wherein a plurality of holding fingers are provided.

32. The cover of claim 31, wherein four or more holding fingers are provided.

33. The cover of claim 24 wherein the groove is curved, the center of curvature of the groove being located within the contour of the cover.

34. The cover of claim 24 wherein a first end of the groove pointing towards the flap.

35. The cover of claim 24 wherein the flap and a second end of the groove are arranged on opposite sides of the cover.

36. The cover of claim 24 wherein the cover is made from plastics.

37. A welding wire container provided with the cover according to claim 24.

38. The cover of claim 24 wherein the groove is curved, the center of curvature of the groove being located within the contour of the cover.

39. The cover of claim 24 wherein the flap and a second end of the groove are arranged on opposite sides of the cover.

* * * * *